United States Patent [19]

Michl et al.

[11] Patent Number: 4,864,537

[45] Date of Patent: * Sep. 5, 1989

[54] POLYMERS AND DYE COMBINATIONS AND METHODS FOR THEIR USE IN OPTICAL RECORDING

[75] Inventors: Josef Michl, Salt Lake City, Utah; Parvathi S. Murthy, Middletown, N.J.

[73] Assignee: University of Utah, Salt Lake City, Utah

[ * ] Notice: The portion of the term of this patent subsequent to Nov. 5, 2002 has been disclaimed.

[21] Appl. No.: 795,219

[22] Filed: Nov. 5, 1985

Related U.S. Application Data

[63] Continuation-in-part of Ser. No. 368,072, Apr. 14, 1982, Pat. No. 4,551,819.

[51] Int. Cl.$^4$ .............................................. G11C 13/04
[52] U.S. Cl. .................................. 365/127; 365/120; 365/121
[58] Field of Search ............... 365/120, 121, 124, 127, 365/122

[56] References Cited

U.S. PATENT DOCUMENTS 3,868,653  2/1975  Winter ........................ 340/173 LS
4,551,819  11/1985 Michl et al. ........................ 365/120

FOREIGN PATENT DOCUMENTS 56-21894  2/1981  Japan .
56-25243  3/1981  Japan .
56-27136  3/1981  Japan .

OTHER PUBLICATIONS

Blume, H. and Bader, T., "Bi-Directional Holographic Information Storage Based on the Optical Reorientation of F$_A$ Centers in KCl:Na," 12 *Optics Communications*, No. 2, pp. 147–151 (Oct. 1974).

J. Morgan, "Introduction to Geometrical and Physical Optics", Chapter 16, McGraw-Hill Book Company, Inc. (1953), chapter is entitled *Polarization*.

D. von der Linde et al., "Multiphoton Photorefractive Processes for Optical Storage in LiNbO$_3$," 25 *Applied Physics Letters* 155–157 (Aug. 1974).

V. N. Seleznev et al., "Materials for Erasable Optical Memories (Review)," 4 Soviet *Journal of Quantum Electronics* 819–827 (Jan. 1975).

D. von der Linde et al., "High-Sensitivity Optical Recording in KTN by Two-photon Absorption," 26 *Applied Physics Letters* 22–24 (Jan. 1975).

R. L. Kurtz et al., "Holographic Recording Materials—A Review," 14 *Optical Engineering* 393–401 (Sep.-Oct. 1975).

R. A. Bartolini et al., "Review and Analysis of Optical Recording Media," 15 *Optical Engineering* 99–108 (Mar.-Apr. 1976).

G. R. Levinson et al., "Laser Processing of Thin Films (Review)", 6 Soviet *Journal of Quantum Electronics* 885–896 (Aug. 1976).

D. von der Linde et al., "Multiphoton Processes for Optical Storage in Pyroelectrics," 10 *Ferroelectrics* 5–8 (1976).

Paper, J. Corcoran et al., "Melting Holes in Metal Films for Real-Time, High-Density, Permanent Digital Data Storage," Ampex Corporatation, Redwood City, Calif. (Sep. 1977).

G. C. Kenney et al., "An Optical Disk Replaces 25 Mag Tapes," *IEEE Spectrum* 33–37 (Feb. 1979)..

K. Bulthuis et al., "Ten Billion Bits on a Disk," *IEEE Spectrum* 26–33 (Aug. 1979).

J. M. O'Reilly et al., "Scanned Laser Marking of Metallic and Organic Films," 23 *Photographic Science and Engineering* 314–318 (Sep. -Oct. 1979).

M. S. Cohen, "Computer Modelling Study of Ablative Optical Recording," 36 *Applied Physics* 950–953 (Jun. 1980).

P. Hariharan, "Holographic Recording Materials: Recent Developments," 19 *Optical Engineering* 636–641 (Sep./Oct. 1980).

P. Kivits et al., "Superheating of Thin Films for Optical Recording," 24 *Applied Physics Letters* 273–278 (1980).

D. G. Howe et al., "Solvent-Coated Organic Materials for High-Density Optical Recording," 18 *Journal of Vacuum Science Technology* 92–99 (Jan./Feb. 1981).

D. Y. Lou et al., "Bit Oriented Optical Storage with Thin Tellurium Films," 18 *Journal of Vacuum Science Technology* 78–86 (Jan/Feb. 1981).

David Y. Lou, "The Archival Stability of Tellurium Films for Optical Information Storage," 128 *Journal of the Electrochemical Society* 699–701 (Mar. 1981).

David Y. Lou et al., "Defect Measurements in Digital Optical Disks," 20 *Applied Optics* 887–891 (Mar. 1981).

Article, "Self-Developing Holographic Material Does (List continued on next page.)

*Primary Examiner*—Terrell W. Fears
*Attorney, Agent, or Firm*—Workman, Nydegger & Jensen

[57] ABSTRACT

A polymer and dye combination suitable for use in optically recording information. The present invention includes a material which may exhibit the property of birefringence under selected conditions such as when stretched. This birefringence can be relaxed in localized areas by heating the localized areas. Incorporated within the material is a dye. The dye is selected so that it has a high optical density, or absorption maximum, in a specific range. This range may cover, for example, the wavelength of a gallium arsenide laser. Radiation with a wavelength within the selected range is the directed into the material at selected locations. This radiation is converted to heat, which in turn relaxes the birefringence in the localized areas or may cause other physical or chemical changes within the polymer. The localized relaxation of birefringence or other change can then be detected or "read." This allows information to be optically recorded on the polymer and subsequently detected and used.

29 Claims, No Drawings

OTHER PUBLICATIONS tical Storage Media," 39 *Applied Physics Letters* 532–534 (1981).

J. Drexler, "Drexon Optical Memory Media for Laser Recording and Archival Data Storage," 18 *Journal of Vacuum Science Technology* 87–91 (1981).

M. W. Goldberg et al., "Preheat-Aided Optical Disc Recording," 39 *Applied Physics Letters* 583–585 (1981).

V. B. Jipson et al., "Infrared Dyes for Optical Storage," 18 *Journal of Vaccum Science Technology* 105–109 (1981).

P. Kivits et al., "Laser Induced Melting and Superheating in Te and In Films for Optical Data Storage," 24 *Applied Physics* 307–310 (1981).

P. Kivits et al., "Vanadyl Phthalocyanine: An Organic Material for Optical Data Recording," 26 *Applied Physics Letters* 101–105 (1981).

T. W. Smith, "The Role of Polymers in Optical Recording Media," 18 *Journal of Vacuum Science Technology* 100–104 (1981).

V. W. Wood et al., "Optical Erasure of One- and Two-Photon Holograms in Fe-Doped $LiNbO_3$", 34 *Ferroelectrics* 175–178 (1981).

Jon K. Clemens, "Video Disks: Three Choices," *IEEE Spectrum* 38–42 (Mar. 1982).

David Y. Lou, "Characterization of Optical Disks," 21 *Applied Optics* 1602–1609 (May 1982).

Advertising brochure entitled "Drexon Optical Memory Discs for Laser Recording and Archival Data Storage", Drexler Technology Corporation, 2557 Charleston Rd., Mountain View, Calif.

Not Degrade When Read by Laser," *Laser Focus* 22–24 (Mar. 1981).

T. H. Allen et al., "Optical Properties of Tellurium Films Used for Data Recording," 20 *Optical Engineering* 373–376 (May/Jun. 1981).

C. D. Eden, "Vanadium Dioxide Storage Material," 20 *Optical Engineering* 377–378 (May/Jun. 1981).

D. Strand, "Optical Recording with Amorphous Materials," 20 *Optical Engineering* 379–381 (May/Jun. 1981).

H. Brody, "Materials for Optical Storage: A State-of-the-Art Survey," *Laser Focus* 47–52 (Aug. 1981).

G. C. Bjorklund et al., "Recording of Gated Holograms Using Two-Photon Photochemistry," 24 *IBM Technical Disclosure Bulletin No.* 4 (Oct. 1981).

R. E. Kunz et al., "Optical Information Storage by Spatial Lifetime Hole Burning," 24 *IBM Technical Disclosure Bulletin* No. 5 (Oct. 1981).

M. D. Levenson, "Time Domain Optical Information Storage in Systems Capable of Photochemical Hole Burning," 24 IBM *Technical Disclosure Bulletin* No. 6 (Nov. 1981).

C. R. Jones, "Fluorescent Imaging System," 24 *IBM Technical Disclosure Bulletin* No. 6 (Nov. 1981).

R. A. Bartolini, "Media for High Density Optical Recording," 18 *Journal of Vacuum Science Technology* 70–74 (1981).

H. G. Craighead et al., "Microscopically Textured Op-

POLYMERS AND DYE COMBINATIONS AND METHODS FOR THEIR USE IN OPTICAL RECORDING

BACKGROUND

1. The Field of the Invention

The present invention is directed generally to polymer and dye combinations for use in optical recording. More specifically, the material combinations disclosed herein are particularly useful in optical recording utilizing thermal relaxation of birefringence induced within the polymer.

2. Related Applications

This application is a continuation-in-part of copending application Ser. No. 368,072, filed Apr. 14, 1982, entitled "OPTICAL RECORDING METHOD AND APPARATUS UTILIZING BIREFRINGENT MATERIALS," now U.S. Pat. No 4,551,819, issued Nov. 5, 1985.

3. The Background of the Invention

In light of the constant improvements in the field of computer technology, video recording, and the like, it has become necessary to improve the means by which data can be rapidly and accurately recorded and accessed. Furthermore, the increasing dependence upon computer generated and recorded information and data has created problems in storing the vast amounts of information and data which are now available.

Currently, storage media typically fall into four general classifications: (1) permanent storage media on which information is recorded and then the media is rendered incapable of further recordation; (2) permanent archival storage media which is similar to a permanent storage media except that it has a much longer life; (3) postable storage media on which further information can be recorded after the initial recordation of information; and (4) erasable media. It will be readily appreciated that with the ever expanding uses for data storage, including the storage of audio visual presentations, the need for new and improved recording methods and media in each of these classifications is increasing.

In the past, magnetic tapes or discs have been the most common storage media for information and data. While magnetic storage media have the advantage of being erasable, they also have the disadvantage of being relatively low in storage density. Thus, a large volume of magnetic tape is required to store a relatively small amount of information. Accordingly, a great deal of attention has been directed toward the development of optical recording media, which are capable of recording information at a much higher density. Because most optical recording methods and media are not erasable, this type of media has been generally used for archival storage of records, documents, music, and other types of information.

In general, optical recording media employ a focused laser to induce a chemical or physical change at the point of contact between the laser and the recording media. This forms a "spot" of about one micron in diameter. In order to "write" information, the information is first converted into a digital format. Utilizing a binary format, for example, the information is converted into one of two possible symbols. These symbols may be thought of as on-off, black-white, yes-no, or 1 and 0. By coupling electrical impulses having a binary format to a light beam modulator, it is possible to reproduce the information as a set of pulses of the laser which are then directed onto the photosensitive medium, there forming white and dark spots.

In order to "read" the information, the medium is scanned by a focused laser at low power. The pattern of white and dark spots is observed to reconstruct the binary code, which in turn can be readily converted back to its original form. A low power laser is employed in this process in order to prevent further writing on the medium.

Currently, several forms of optical recording materials have proven useful to varying degrees in recording information. These classes of materials include photographic films, photoresists, photopolymers, thermoplastics, photochromics, chalcogenide film, ablative thin films, photoferroelectric, photoconductive/electroptic, and electro-optic Each of these techniques, however, have proven to be less than satisfactory for various reasons.

The primary problem encountered in the use of photographic film, for example, is that a processing step is necessary before the data can be read. That is, the photographic film must be "developed" before it can be read. Not only does this additional processing step require additional time and facilities, but it also makes it impossible to read the information immediately after writing.

Another disadvantage of photographic films is the fact that they have low sensitivity. As a result, long laser pulses are required for the writing step, thereby slowing the writing process. Also, high costs of fabrication of photographic films, as well as additional development costs, make the use of photographic films for recording data difficult and expensive.

Photoresists are light sensitive organic materials which, upon exposure and development, form image relief patterns. The readout process measures the difference in phase between light reflected from the relief patterns in comparison to light reflected from the unexposed areas. Again, a processing step is required prior to reading the relief patterns formed by the photoresists. In addition, these materials are unstable in heat and light and have a low sensitivity. As a result, these materials are currently unacceptable as a media for recording data.

Photopolymers are organic compounds capable of undergoing photochemical reactions when irradiated with light having a certain frequency. These photochemical reactions result in products having refractive indices substantially different from those of the starting material. Thus, the recorded data is read by observing the presence or absence of localized changes of the refractive index of the medium. The primary difficulty with these materials is that if reading is done with the same laser which is used for writing, even at very low power, additional writing on the recording medium will occur. Thus, for practical use of such photopolymers, it is necessary to use a second laser wave length for reading at a frequency that is not absorbed by the recording medium.

Ablative thin films are currently the most widely used media for optical recording. Such media utilize a thin film of material capable of absorbing a coded beam of light at a desired frequency onto a substrate. The recording mechanism is essentially thermal in nature and utilizes the energy of the absorbed laser beam to either melt or actually ablate the material. The result is that dips or even holes in the film are formed. Readout can be accomplished either by means of reflector or transmission of light wherein the ablative holes or dips are used to modulate the intensity of the light beam. Currently the preferred material for use in these ablative thin films is tellurium. However, it should be noted that the use of tellurium is disadvantageous because of its high cost and its instability in air.

Thermoplastic materials are prepared by forming a multi-layer structure consisting of a substrate, such as glass or mylar; a thin conductive layer, such as gold or silver; a photoconductor, such as polyvinylcarbazole sensitized with trinitro-9-fluorenone; and a thermoplastic. The recording technique consists of forming a uniform charge on the surface of the thermoplastic so that the voltage is capacitively divided between the photoconductor and thermoplastic layers. Upon optical exposure, the photoconductor conducts at the points of illumination and thus discharges the voltage at that point. After exposure, the thermoplastic is heated so that the electrostatic forces deform the surface of the thermal plastic into a relief pattern which corresponds to the optically recorded information. It is found, however, that these materials cannot be used to achieve high density recording and, in addition, the cost of the material is prohibitively high.

A photochromic material is one which may exist in two or more relatively stable states having different optical properties. Such a material may be switched from one state to the other by photon radiation. This change of state may result in either difference absorption spectra or a difference in refractive index. This medium presently suffers from a problem of low sensitivity and thus, low accuracy in recording the desired information.

The other presently available techniques mentioned above also have various disadvantages. For example, chalcogenide materials reversibly switch between the amorphous and crystalline states upon heating, such as with a laser. However, they are currently of little practical significance because they are unstable, require high laser power for writing, must be formed as a thin layer in a manner similar to the ablative thin films, and must be read with a second laser having a different wave length than the writing laser.

Magneto-optic, photoferroelectric, and electro-optic materials utilize changes in the magnetic or electrical characteristics of a medium. However, none of these materials have yet been proven to be practical for use in optical recording of data. At the same time, photoconductive and electro-optic materials, while both photoconductive and linearly optic, may be used only for a few hours. As a result, none of these materials have been found practical for application in photorecordation of data.

From the foregoing, it can be seen that it would be highly desirable to develope a photo-optic recording medium which avoided the various disadvantages encountered in presently available photo-optic methods. Accordingly, it would be a significant advancement in the art to provide a material which was capable of use as an optical recording medium which utilized low writing energies. It would also be a significant advancement in the art to provide an optical recording medium which utilized thin films having high optical density.

It would be another advancement in the art to provide such a medium which allowed for reading with a low energy reading beam and which required no processing in which to read. It would be another advancement in the art to provide a stable recording medium capable of high density recording and involving a low signal to low noise ratio. It would also be extremely advantageous to provide such a medium which was low in cost and easy to manufacture. Such a medium, and methods for its use, are disclosed below.

BRIEF SUMMARY AND OBJECTS OF THE INVENTION

The present invention is directed to novel storage materials for use in optically recording information, and methods for reading and writing information on such materials. In particular, the novel storage media are comprised of polymers having a dye dissolved or otherwise incorporated within the polymer. The specific polymer is chosen generally such that it displays the property of birefringence when it is stretched. Information may be stored on the polymer by modifying the birefringence of the polymer material. This modification of birefringence is aided by the dye. According to the present invention, the polymer and dye are chosen such that only a small amount of energy is required to modify the birefringence, yet the recording medium is stable and easily read.

The dye is preferably chosen so that it has an absorption maximum at a particular frequency. In addition, the dye is chosen such that it emits absorbed energy in the form of heat. Thus, when radiation of the appropriate wavelength is directed into the polymer/dye system, the dye absorbs that radiation and converts it to heat.

It is presently desirable to produce a polymer/dye system which is sensitive to gallium arsenide lasers because gallium arsenide lasers are relatively inexpensive and widely available. Polymer/dye systems which are sensitive to these lasers, therefore, will be widely useful with conventionally available equipment. Thus, a dye is chosen which will effectively absorb radiation produced by a gallium arsenide laser.

As mentioned briefly above, birefringence may be induced into a polymer/dye system by stretching the polymer as well as by other methods. At the same time, the birefringence of the polymer system can be relaxed by localized heating. Thus, the principle of operation of the current invention is easily understandable.

First, the polymer is stretched to a point where a desired level of birefringence is induced. A writing laser beam is then produced at a frequency which is readily absorbed by the dye and is then directed into the polymer/dye system. The writing laser beam causes localized heating, and thus, partial or complete relaxation of the birefringence in the localized area of the polymer film. The power level of the laser beam is chosen so that relaxation takes place yet melting or ablation of the film preferably does not occur.

When it is desired to read the film, a separate readout beam, which may be the same as the writing beam, is directed through the recorded area. It is found that the polarization of the readout beam will be different after passage through a recorded area than after passage through an unrecorded area, since the various areas differ in the degree of birefringence. The change in the polarization of the readout beam can be detected, and the data contained on the polymer/dye system can thus be read. A change in polarization can be detected in both the transmission or reflection mode.

The transmission mode of operation is particularly easy to understand. It is assumed that if the birefringence of the stretched polymer is such that it acts as a half wave plate, then the polymer will produce a light field when placed between crossed polarizers at a 45° angle between the polarizer axis and the stretch direction. However, a relaxed area of the polymer will have no effect on the polarization state of the light and will appear dark between the crossed polarizers.

It is, therefore, a primary object of the present invention to provide a recording medium for use in optical recording of data.

It is a related object of the present invention to provide a polymer/dye system which is capable of being used as a recording medium and which is sensitive to lasers of a particular wavelength.

Another object of the present invention is to provide a recording medium which can be written on and read with low energy lasers and which can be read without processing.

It is still another object of the present invention to provide a recording medium which employs a thin film having a high optical density.

Another object of the present invention is to provide a recording medium which is stable, has a high signal to low noise ratio, and which is capable of high density data recording.

These and other objects and advantages of the invention will become apparent upon reading the following detailed description and appended claims.

BRIEF DESCRIPTION OF THE DRAWINGS

FIG. 1 is a schematic representation of linearly polarized light waves passing through an isotropic location in the birefringent medium and then being blocked by a polarizer crossed with respect to the polarization plane of the initial light wave.

FIG. 2 is a schematic representation of linearly polarized light waves becoming circularly polarized after passing through an aniostropic location in the birefringent medium having the characteristics of a quarter-wave plate and then being attenuated by a polarizer crossed with respect to the polarization plane of the initial light wave.

FIG. 3 is a schematic representation of linearly polarized light passing through an anisotropic location in the birefringent medium having the characteristics of a half-wave plate and then passing through a polarizer crossed with respect to the polarization plane of the initial light wave.

DETAILED DESCRIPTION OF THE INVENTION

As discussed above, there has been a great deal of interest recently in the use of polymers as part of optical information storage systems. The role of the polymers has varied, but is generally related to their use as a medium on which information can be stored. That is, information is "written" in some manner on the polymer and is then "read" when access to the information is desired.

Various mechanisms for writing and reading using polymers have been developed, and some methods are outlined above. These methods involve inducing some type of physical or chemical change in the polymer by the "writing" means. The means for writing on the polymer is often a laser or other concentrated light source. The laser may cause actual physical changes on the polymer film and may even ablate the film surface.

Once the polymer film has been changed, the change may be detected by a "reading" means. This reading means may also be a laser, such as a low energy laser, which is capable of detecting the physical or chemical changes which were previously "written" on the film. It is, of course, desirable that the film be read in such a way that additional material is not written on the film.

One method of writing information on polymer films is through the use of thermal relaxation of birefringence induced in the polymer. This mechanism is discussed in a co-pending application entitled "Optical Recording Method and Apparatus Utilizing Birefringent Materials," Ser. No. 368,072, filed Apr. 14, 1982, which application is incorporated herein by this reference, now U.S. Pat. No. 4,551,829, issued Nov. 5, 1985.

One mechanism to enhance the ability to write on a polymer using a laser, or similar energy source, is to incorporate a dye into the polymer. The dye is chosen such that it readily absorbs the radiation emitted by the laser. The resulting polymer/dye system, therefore, will be more capable of absorbing the writing energy than is the polymer alone. This enables writing to occur with a lower power writing source. As a result, writing can be accomplished more quickly and accurately, without risking damage to the polymer film.

A. The Polymer-Dye System

In choosing a dye to incorporate into a polymer system, several important criteria may be identified. For example, many data storage systems rely on thin polymer films in order to operate effectively and economically. At the same time, it is generally important for the polymer/dye system to absorb a high percentage of the energy directed into the system. That is, the thin polymer film must be essentially opaque (i.e., have a high optical density) to the writing beam. In order to achieve a high level of opacity, it is critical that the dye be highly soluble in the polymer. This high solubility allows a sufficient percentage of dye to be incorporated within the polymer to result in a high degree of energy absorption, even using a thin polymer film.

Another important criterion is that the dye absorb energy of particular wavelengths. That is, the dye should have a high optical density and a high extinction coefficient at wavelengths corresponding to the writing beam. This aids in accomplishing the same general purposes as those accomplished by a highly soluble dye. That is, a high extinction coefficient at a particular wavelength assures that a high percentage of the writing beam will be absorbed by the polymer/dye system.

Because of the wide acceptance and relatively low cost of the gallium arsenide (GaAlAs) laser, it is frequently desirable to incorporate into a polymer a dye which absorbs the radiation emitted by such a laser. The GaAlAs laser generally emits radiation at about 823 nm. Thus, dyes which absorb (i.e., have high optical densities) in this general range are expected to be frequently preferred, within the scope of the present invention, for incorporation into the polymer/dye system.

A further criterion in choosing an appropriate dye is the nature of its behavior upon being irradiated by the writing beam. Specifically, for most data recording uses it is desirable that the dye emit heat when it is struck by a laser writing beam. This is in contrast to dyes that may reemit light, or fluoresce, when irradiated. The property of emitting heat is of particular importance in the thermal relaxation to birefringence technique described more fully below. Thus, a heat emitting dye will generally be preferred for use within the scope of the present invention.

Various dyes within the scope of the present invention possess the desirable qualities discussed above. These dyes have absorption peaks in the general range of the light emitted by the GaAlAs laser. Generally, these peaks are between 700 nm and 900 nm and are more preferably in the range of from about 800 nm to about 880 nm. When it is important to specifically match the absorption peak of the dye with the laser radiation, dyes having peaks in the range of from about 815 nm to about 830 nm are most preferred.

Dyes which are preferred within the scope of the present invention include polymethine dyes. Not only are these dyes capable of absorbing GaAlAs radiation, they are very soluble in several commonly available polymers. Furthermore, these dyes reemit absorbed laser radiation in the form of heat. As a result, these dyes are found to fully satisfy each of the criteria for acceptable dyes as discussed above.

Two dyes which fit within the criteria discussed above include 1,1,5,5-tetrakis(p-dimethylaminophenyl)-2,4-pentadien-1-ol perchlorate and 1,5-di(p-dimethylaminophenyl)-1,5-diphenyl-2,4-pentadien-1-ol perchlorate. These dyes are readily produced by know procedures such as those taught by Tuemmler et al., "Polymethine Dyes I. A Comparison of Several Vinylogous Series in which the Polymethine Chains are Terminated by Aryl groups," 80 J. Am. Chem. Soc. 3772 (1958). These dyes have decadic molar extinction coefficients in excess of 100,000 at the 820 nm wavelength of the GaAlAs laser and have absorption maximums at 820 nm and 823 nm respectively.

Both of these dyes are found to be highly soluble in commonly used polymers, including polyvinyl chloride and vinylidene chloride-vinyl chloride copolymer.

These dyes have the following chemical structures:

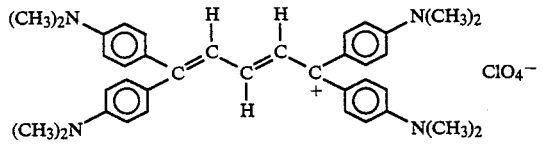

1,1,5,5,-tetrakis (p-dimethylaminophenyl)-2,4-pentadien-1-ol perchlorate.

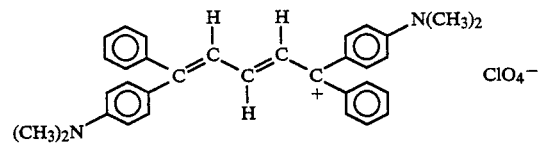

1,5-di(p-dimethylaminophenyl)-1,5-diphenyl-2,4-pentadien-1ol perchlorate.

It appears that the five-member carbon ring and four phenyl groups of these dyes are important structural features in achieving the properties discussed above The other groups bonded to these structures, however, have been found not to be critical in determining the general properties of the dye. Specifically, the perchlorate anion is important only with respect to increasing the solubility of the dye within the polymer. Other anions bonded to the structure may well be acceptable and are not expected to significantly affect the properties of the dye once it is incorporated within the polymer.

Likewise, the various functional groups bonded to the phenyl groups have been found not to affect the general properties of the dye. However, these groups are important in making fine adjustments to the properties of the dye. Substitution of these various functional groups may allow one to produce a dye having absorption maximums closer to a particular most preferred range. In addition to the dimethylamino groups illustrated above, other groups such as halogens, various hydrocarbon groups including methyl, ethyl, propyl, and butyl groups, may be added to the dye molecules or may in certain instances, be substituted for one or more of the dimethylamino groups.

In addition, various polymers may be used in the polymer/dye system of the present invention. Again, the polymer will be chosen to correspond to the particular needs of the system. The polymer should be compatible with the dye so that a large percentage of dye can be incorporated into the polymer. The polymer should also have acceptable physical properties for the particular anticipated use including the ability to have birefringence induced by simple means such as by stretching the polymer.

Two polymers which have been used in experimentation include polyvinyl chloride and a vinylidene chloride-vinyl chloride copolymer. The dyes discussed above were found to be very soluble in these polymers. The polymers also have s acceptable physical properties, become birefringent when stretched, and are easy to handle. While the copolymer was preferred in use in recording information using thermal relaxation of birefringence, a wide variety of other polymers of this general type may find application in polymer/dye systems within the scope of the present invention.

B. Birefringence

It will be appreciated that birefringence is a term applied to certain anisotropic materials; that is, materials in which the observable properties of light change depending upon its polarization and upon the direction that the light travels through the materials. This is in contrast to isotropic materials in which the observable properties of light remain constant regardless of the direction of light travel and polarization.

Birefringence is caused on a molecular level by a regular ordering (whether partial or complete) of molecules. If this regular ordering is disturbed in a localized area, thereby modifying the birefringence, polarized light passing through areas having birefringence will be affected differently than polarized light passing through an unmodified area. Hence, the basic requirement for recording binary-encoded information (i.e., the presence or absence of changes in a physical property at specific locations of a recording media) is present. As will be seen, the present invention also provides for use with other digital formats, or even an analog format.

There are several methods to induce birefringence in materials which are otherwise isotropic; these methods include, for example, stretching, special techniques of crystal formation, and applying shear stresses, an electric field, or a magnetic field. Although the following discussion is directed to the use of a material having birefringence induced by stretching, it will be understood that other methods and materials having birefringence may also be utilized within the scope of the present invention. For example, the use of an electric or magnetic field to induce birefringence would be useful in applications where it is desirable to have an erasable medium. Adjustment of the magnetic or electrical field could be used to restore birefringence to the entire surface of the media after the media was written on, thereby erasing the recorded information.

It is well known that linear birefringence may be induced into a polymer material by stretching at a controlled temperature; the more the material is stretched the more birefringent it will become.

When it is desired to record information (or "write") in a binary format, it is necessary to leave the birefringence undisturbed at locations where it is desired to record a binary "0"and to modify the birefringence where it is desired to record a binary "1"(or vice versa). The easiest method of accomplishing this, at least in birefringent materials which have been made birefringent by stretching, is to apply localized heat at the location on the material where it is desired to modify the birefringence. Such localized heat can be easily generated at the desired locations by use of, for example, a focused laser at a wavelength that will be absorbed by the recording medium.

While it will be appreciated that the laser may be used to produce such localized heat, it will be equally understood that other methods for inducing heat, such as by bringing a heating element in direct contact with the birefringent material, may also be used. As mentioned above, other methods, apart from the application of heat, are also capable of modifying the birefringence at particular locations on the storage medium.

Because of the needed to heat localized areas of the medium (and thereby modify the birefringent character of the medium at that location), it is necessary to construct the medium so that it will absorb light at the writing wavelength. As mentioned above, this may be accomplished by incorporating an appropriate dye into the system. The dye will be chosen such that it has a maximum absorption at approximately the wavelength of the light source.

Significantly, according to the present invention, it is not necessary to actually melt the recording medium or to burn a hole through it in order to record data. Nevertheless, it is also important to note that even if a hole were burned through the storage media, the process still operates and records the information. It is even unnecessary to totally remove the birefringence at the localized spots. Rather, it is only necessary to heat the localized position to a temperature sufficient to cause a measurable modification of the birefringence; this temperature may be termed the "annealing" temperature. Therefore, it is possible to utilize much less heat to make an observable change in the media of the present invention than is required by prior art media.

In order to take maximum advantage of the low amount of heat required to record on the birefringent medium, it is desirable to use media having a thickness as small as possible. Utilizing a medium that is thin requires less power to bring it to the annealing temperature than would be required for media having a greater thickness. It is important that sufficient dye be incorporated within the polymer to render the polymer/dye system sufficiently opaque at the wavelength of the light or other energy source to allow a sufficient quantity of energy to be absorbed.

When the storage medium is being used for the permanent archival storage of information, once the recording process is completed, there is typically no further need for the medium to absorb energy at the writing wavelength. Thus, it may be desirable to utilize a dye that is volatile so that it can escape from the medium following recording, or a dye which is bleachable by ultraviolet radiation or the like, or a dye that is altered by exposure to a chemical vapor (it is well known that ammonia vapor or iodine vapor may be used to alter certain dyes), or by similar methods of rendering the medium incapable of further absorption of light at the writing wavelength.

In order to read the information recorded, it is necessary to determine what information has been recorded onto the birefringent medium. In general terms, the recorded information is "read" by passing a beam of light having a known state of polarization through the medium and determining if the polarization has been modulated as a result through the medium.

Linearly polarized light will not be modulated when passing through an isotropic area. Thus, if a beam is directed upon a position where birefringence has been removed during the writing step, both the E and O waves will travel at the same velocity, and the light will emerge from the bottom of the page as a linearly polarized beam with a polarization plane bisecting the X- and Y-axes.

On the other hand, if the beam is directed upon a spot where the birefringence is still present, and if the medium constitutes a quarter-wave plate at the reading wavelength, the beam will emerge circularly polarized. The coherent sum of the waves in the XZ and YZ planes result in a vector whose end sweeps out a circle so that the wave defines a spiral as it propagates along the Z-axis.

Thus, as seen in FIG. 1, if a polarizer 19 is oriented behind the birefringent media 15 at a right angle relative to the polarization direction of the beam 16 before it passes through the media, it is possible to easily determine whether birefringence was present or had been removed at that location. If the birefringence has been totally removed, as represented by material 15a in FIG. 1, the beam will remain linearly polarized and, therefore, will be completely blocked by the crossed polarizer.

In contrast, as depicted in FIG. 2, if the birefringence is left intact, and if the material 15b constitutes a quarter-wave plate at the reading wavelength, about one half of the emergent circularly polarized beam will be passed. As a result, the recorded areas (where the birefringence has been removed) will show up as dark spots on a light field. The digitally encoded information may then be read in a conventional manner.

Note that the reading method just described results in the total blocking of the unmodulated beam, and a blocking of about one-half of the modulated beam. In order to improve the contrast between the light and dark spots, it may be desirable to utilize a half-wave plate in place of a quarter-wave plate. Thus, in FIG. 3, the birefringent material 15c constitutes a half-wave plate at the reading wavelength.

After beam 16 passes through a half-wave plate, the E and O rays will be one-half wavelength out of phase; this results in a beam 18 linearly polarized at right angles to the original beam. As shown in FIG. 3, the emergent beam 18 will be passed by polarizer 19, resulting in essentially complete transmission.

Inasmuch as FIG. 1 depicts a beam 16 passing through a location of the birefringent material where all birefringence had been removed, it can be seen that the use of a birefringent material 15c exhibiting the characteristics of a half-wave plate results in optimum contrast.

It should be understood that the polarizer may be oriented parallel to the plane of polarization of original beam 16 rather than at a right angle thereto. When this is done, the unmodulated beam 16 will be completely passed by the polarizer and the modulated beam 18 will be completely blocked. Thus, maximum contrast is achieved.

According to the present invention, a quarterwave plate can be made to act like a half-wave plate by placing a reflective surface behind the birefringent material in place of the polarizer 19. On reflection, the beam will once more pass through the medium at the selected spot. In positions where the birefringence has been removed, the light will once again emerge from the medium unmodulated. However, the circularly polarized beam will again separate into the E and O rays, and the E ray will once more travel with a different velocity than the O ray.

Thus, upon reemergence, the E ray will have gained yet another quarter wavelength, putting it a full one-half wavelength out of phase from the O ray. In the same manner as when the beam 16 is passed through a half-wave plate (illustrated in FIG. 3), the result is a linearly polarized beam at right angles to the original beam. The use of such a technique has several practical advantages; the major advantage being that this configuration can be very compact in size.

Accordingly, if a crossed polarizer is placed in the path of the reemergent beam, there will be no transmission in areas where birefringence was removed, but total (i.e., nearly 100%) transmission where the birefringence was left intact. Thus, the recorded areas will show up as dark spots on a light field. Again, a polarizer oriented parallel to the plane of polarization of the original beam may also be used; this will result in the recorded areas showing up as light spots on a dark field.

Although this discussion has been restricted to a method for reading and writing binary encoded information, it is also possible to record more than two levels of information. By recording more than two levels of information on a single location on the media, it is possible to store more information on the same piece of recording medium, i.e., achieve a higher density of storage. Such higher density storage is an extremely significant advantage of the present invention. Not only does this reduce storage space requirements, but it also significantly speeds up the reading and writing operations since fewer locations need not be written or read to convey the same amount of information.

This multi-level recording (which may be octal, decimal, or even analog) may be done by taking advantage of the fact that it is not necessary to remove all of the birefringence in a particular location in order to distinguish that location from a location where the birefringence has been left intact. It is a simple matter to modulate the writing laser beam so as to record at different power intensities or different pulse-lengths so as to quantitatively remove different amounts of birefringence at different positions. Then, the amount of light passing through a crossed polarizer may be measured quantitatively in order to read information recorded by quantitative optical exposure.

It will be appreciated that when recording data quantitatively onto birefringent media, it may be desirable to use media constructed to different specifications than used to record qualitatively in connection with binary encoded information. For example, it would be advantageous to utilize media having a wide range annealing temperature so that there would be more control over the extent of annealing. Additionally, use of a medium having less birefringence and a greater thickness so that more thermal energy would be necessary to effect smaller changes in birefringence would aid the quantitative recording of information.

In summary, the polymer/dye compositions of the present invention are particularly adaptable for use in recording data. High density, accurate, and low cost data recording is achieved by detecting changes in the birefringence of the polymer/dye system. Specifically, the polymer containing the dye is usually stretched to induce a sufficient amount of birefringence. The stretched polymer is then "written" on by a laser or similar energy source having a wavelength which corresponds generally to one of the dyes absorption maximums. This produces heat within the polymer, which in turn causes a partial or complete relaxation of birefringence at a localized area. This relaxation can then be detected, or "read," by passing a reading beam through the polymer and measuring the differences in birefringence at different locations on the polymer.

C Examples of the Preferred Embodiment

The following examples are given to illustrate the methods and compositions of the present invention and are not intended to limit the scope of the present invention.

EXAMPLE 1

This example describes a polymer/dye system which was found to be useful in recording information using the thermal relaxation of birefringence technique.

Vinylidene chloride-vinyl chloride copolymer (W. R. Grace and Co., Type 930) was cast to a thickness of less than 5 um from a 2-3% solution of 1,1,2-trichloroethane. The solution contained less than 5% 1,1,5,5-tetrakis (p-dimethylaminophenyl)-2,4-pentadien-1-ol perchlorate (the "dye").

The film produced was annealed at 50° C. for 2 minutes and stretched to between 150% and 300% of its original length using a mechanical stretcher. The stretched film was found to be sufficiently birefringent that birefringence could be detected clearly as a light field between cross polarizers under a microscope.

The thickness of the film was less than 5 um as determined by weighing a known area of film and calculating thickness using the published density of the polymer. See Modern Plastics Encyclopedia, McGraw Hill, Inc. (1975–1976).

The dye was synthesized using known procedures. The dye had absorption maximums at 820 nm and 630 nm. The dye had a decadic molar extinction coefficient in excess of 100,000 at the 820 nm wavelength of a GaAlAs laser and was very soluble in the polymer. The polymer showed weak dichroism, having a dichroic ratio of about 1.2 at 823 nm. The high extinction coefficient and high solubility resulted in an optical density in excess of 1.0 at 820 nm, and less than 0.6 near 600 nm.

A CW laser diode (RCA C86014E) was operated in a pulsed mode using the current-amplified TTL pulses of a variable-length pulse generator (Global Industries 4001). The emission wavelength was 823 nm and the light was linearly polarized to 87%. The elliptical beam was collimated and focused using special laser diode optics (Melles Griot 06 GLC 002). The depth of focus was about 15 um. The spot image was elliptical and its size was approximately 4×1 um. Detection of the transmitted light was accomplished using a photodiode (United Detector Technology PIN 125) operated in the photoconductive mode with a response time of 10 us and observed on a 60 MHz oscilloscope (Tektronics 2215) A dichroic sheet polarizer (Melles Griot 03 FPG 001) was placed before the detector at 90 degrees to the inherent polarization of the laser diode.

This arrangement produced 5 mW pulses of time durations between 10 us and about 25 ms, limited by the cooling requirements of the laser diode.

Sample position was controlled in three mutually orthogonal directions. The axis collinear with the laser light propagation axis was controlled within 1 um, the perpendicular axes within 0.1 um, (Newport Research corporation 420-0.5, Oriel 18320 & 18009). Overall control was accomplished with a custom-interfaced microcomputer (Franklin Ace 1000), making possible the production of the repetitive patterns necessary for survey work.

The recorded dots were examined and photographed under a polarizing optical microscope (Nikon Biophot).

Marking with the laser beam resulted in holes for exposure times longer than 750 us while no holes were burned at 500 us or 250 us exposure times. The recording with these shorter pulses still produced noticeable marks. When viewed between parallel polarizers under a microscope, these dots had a central lighter region (3.4 um in diameter for 500 us pulses and 2.7 um in diameter for 250 us pulses) surrounded by a dark ring and appeared lighter than the rest of the polymer. Under these conditions the holes burned with longer exposures appeared bright within a dark band. Between crossed polarizers, all marks appeared dark on a light background. For the marks obtained with 500 us and 250 us pulses, the contrast between marked and unmarked areas was better when viewed between perpendicular polarizers than between parallel polarizers. The spots appeared identical when viewed from either side of the film. This is the theoretically expected behavior for the central part at the recorded spot.

This polymer/dye system, therefore, would be acceptable for recording data and reading that data using the thermal relaxation of birefringence technique discussed above.

EXAMPLE 2

This example also describes a polymer/dye system which was found to be useful in recording information using the thermal relaxation of birefringence technique.

This example is the same as Example 1 except that 1,5-di(p-dimethylaminophenyl)-1,5-diphenyl-2,4-pentadien-1-ol perchlorate dye was substituted for the dye described in Example 1. This dye has absorption maxima at 823 nm and 575 nm.

The experimental procedure and results are the same in this example as those described in Example 1. This polymer/dye system, therefore, would be acceptable for recording data and reading that data using the thermal relaxation of birefringence technique discussed above.

EXAMPLE 3

This example also describes a polymer/dye system which may have application in the optical recording of data.

This example is the same as Example 1 except that polyvinyl chloride polymer is substituted for the polymer of Example 1. The polymer was cast from 2-butanone rather than 1,1,2 - trichloroethane. The remainder of the experimental procedure was the same as that described in Example 1.

Using the polymer/dye system marking could be produced down to an exposure time of 2.5 ms. Shorter pulses produced no marks. All of the marks consisted of a central hole surrounded by a dark band. The size of the smallest hole, as seen through parallel polarizers, was 2.4 um. The size of the marks increased with increased exposure time.

EXAMPLE 4

In this example, the polyvinyl chloride polymer of Example 3 was combined with the 1,5-di(p-dimethyl aminophenyl)-1,5-diphenyl-2,4-petadien-1-ol perchlorate dye described in Example 2. The experimental technique and results were the same as that described in Example 3.

In the examples described above, the threshold exposure time for obtaining birefringence relaxation was found to depend on the thickness of the films used. The parameter that limited the thickness of the sheets used in these experiments was the degree of birefringence that could be induced on stretching. As the thickness of the film decreases the birefringence induced upon stretching also decreases, so that eventually it becomes difficult to identify the marked regions by inspection under a polarizing microscope.

It is expected that there will always be exposure times sufficiently short and light intensities sufficiently weak to produce no noticeable recording. This threshold type of behavior is desirable for the read-out process, as such a reading beam will not cause any recording and damage to the material.

D. Summary

In summary, the present invention discloses polymer/dye systems which are useful in the optical recording of information. Specifically, it has been found that dyes having absorption maxima in the range of the wavelength of an optical writing source are particularly useful in facilitating the optical recording of data. Such dyes incorporated within a polymer system allow the polymer to more completely absorb the writing source. Thus, physical or chemical changes are more readily induced within the polymer As discussed fully above, one technique which may incorporate such a polymer/dye system is the thermal relaxation of birefringence technique. Since this technique depends on the absorption of laser radiation to induce relaxation of birefringence within the polymer, the usefulness of a dye which absorbs the laser radiation is clear. The dye allows the laser to operate at lower power and to record in a shorter period of time. At the same time, it is still possible to read the changes in birefringence with a laser having lower power than that needed to write on the polymer. This provides for an excellent system for high speed and high density recording using optical recording methods.

The invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A polymer-dye system for use in recording information transmitted by an optical beam having a predetermined wavelength comprising:
   a birefringent polymeric material; and
   a dye incorporated within the polymeric material, the dye having a high optical density within a predetermined range of wavelengths corresponding to the wavelength of the optical beam such that birefringence induced within the polymeric material can be relaxed in localized areas by contacting those areas with light of the predetermined wavelength.

2. A polymer-dye system as defined in claim 1 wherein the dye is dissolved within the polymeric material.

3. A polymer-dye system as defined in claim 2 wherein the dye is highly soluble in the polymeric material.

4. A polymer-dye system as defined in claim 1 wherein the dye emits absorbed radiation primarily as heat.

5. A polymer-dye system as defined in claim 1 wherein the dye has a high optical density in the range of from about 700 nm to about 900 nm.

6. A polymer-dye system as defined in claim 1 wherein the dye has a high optical density in the range of from about 800 nm to about 880 nm.

7. A polymer-dye system as defined in claim 1 wherein the dye has a high optical density in the range of from about 815 nm to about 830 nm.

8. A polymer-dye system as defined in claim 1 wherein birefringence is induced within the polymeric material by stretching the material.

9. A polymer-dye system as defined in claim 8 wherein the birefringence of the polymer material can be relaxed in localized areas by heating those localized areas.

10. A polymer-dye system capable of use in recording information comprising:
    a polymeric material which exhibits birefringence when stretched, which birefringence can be relaxed in localized areas by heating those areas; and
    a dye dissolved within the polymeric material, the dye having a high optical density within a predetermined range of wavelengths such that when the polymer-dye system is exposed to radiation within the predetermined range of wavelengths heat is generated.

11. A polymer-dye system as defined in claim 10 wherein the dye has a high optical density in the range of from about 700 nm to about 900 nm.

12. A polymer-dye system as defined in claim 10 wherein the dye has a high optical density in the range of from about 800 nm to about 880 nm.

13. A polymer-dye system as defined in claim 10 wherein the dye has a high optical density in the range of from about 815 nm to about 830 nm.

14. A polymer-dye system as defined in claim 13 wherein the dye is selected from the group consisting of: 1,1,5,5-tetrakis(p-dimethylaminophenyl)-2,4-pentadien-1-ol perchlorate and 1,5-di(p-dimethylaminophenyl)-1,5-diphenyl-2,4-pentadien-1-ol perchlorate.

15. A polymer-dye system as defined in claim 14 wherein the polymeric material is a copolymer of vinylidene chloride and vinyl chloride.

16. A polymer-dye system as defined in claim 14 wherein the polymeric material is polyvinyl chloride.

17. A method for recording information comprising the steps of:
    obtaining a birefringent polymeric material;
    incorporating a dye within said polymeric material wherein the dye has a high optical density within a predetermined range;
    selecting locations on the birefringent material where it is desired to record information; and
    irradiating the selected locations with radiation having a wavelength within the range wherein the dye has a high optical density such that the birefringence of the material is modified at the selected locations such that information is recorded on the birefringent polymeric material.

18. A method as defined in claim 17 wherein the dye comprises a polymethine dye.

19. A method as defined in claim 18 wherein the birefringence of the material is changed by heat relaxation of the birefringence at the selected locations.

20. A method as defined in claim 17 wherein birefringence is induced in said polymeric material by stretching the material.

21. A method as defined in claim 17 wherein the dye has a high optical density in the range of from about 700 nm to about 900 nm.

22. A method as defined in claim 17 wherein the dye has a high optically density in the range of from about 800 nm to about 880 nm.

23. A method as defined in claim 17 wherein the dye has a high optical density in the range of from about 815 nm to about 830 nm.

24. A method as defined in claim 17 wherein the radiation used to irradiate the selected locations on the material is produced by a gallium arsenide laser.

25. A method as defined in claim 17 wherein the polymer comprises a copolymer of vinylidene chloride and vinyl chloride.

26. A method for recording information and reading information comprising the steps of:
    obtaining a polymeric material;
    incorporating a dye within the polymeric material, the dye having a high optical density within a predetermined range and the dye emitting absorbed radiation in the form of heat;
    inducing birefringence into the polymeric material by stretching the material;
    selecting locations on the birefringent material where it is desired to record information;
    striking the selected locations with radiation having a wavelength within the range of the high optical density of the dye such that heat is generated at the selected locations causing localized thermal relaxation of birefringence in the polymeric material; and
    detecting the locations at which birefringence has been relaxed.

27. A polymer-dye system as defined in claim 1 wherein the polymer is selected from the group consisting of polyvinyl chloride and vinylidene chloride-vinyl chloride copolymer.

28. A polymer-dye system as defined in claim 1 wherein the dye is a polymethine dye.

29. A polymer-dye system as defined in claim 1 wherein the dye is selected from the group consisting of 1,1,5,5-tetrakis (p-dimethylaminophenyl)-1,5-diphenyl-2,4-petadien-1,5-diphenyl-2,4-penadien-1-ol perchlorate.

* * * * *

UNITED STATES PATENT AND TRADEMARK OFFICE
CERTIFICATE OF CORRECTION

PATENT NO. : 4,864,537

DATED : September 5, 1989

INVENTOR(S) : JOSEF MICHL et al.

It is certified that error appears in the above-identified patent and that said Letters Patent is hereby corrected as shown below:

```
Column 3, line 56, "develope" should be --develop--
Column 7, line 57, "above" should be --above.--
Column 8, line 26, "s acceptable" should be --acceptable--
```

Signed and Sealed this

Twenty-eighth Day of May, 1991

Attest:

HARRY F. MANBECK, JR.

Attesting Officer

Commissioner of Patents and Trademarks